United States Patent [19]

MacLeod

[11] Patent Number: 4,589,795
[45] Date of Patent: May 20, 1986

[54] BEAM COUPLING

[75] Inventor: Colin J. MacLeod, Newark, England

[73] Assignee: Caledonian Mining Company Ltd., England

[21] Appl. No.: 692,358

[22] Filed: Jan. 16, 1985

[30] Foreign Application Priority Data

Jan. 17, 1984 [GB] United Kingdom ............... 8401175

[51] Int. Cl.⁴ ........................... B25G 3/00; F16B 7/08
[52] U.S. Cl. ..................................... 403/233; 403/191
[58] Field of Search ............... 403/230, 233, 256, 382, 403/403, 363, 234, 191; 248/228

[56] References Cited

U.S. PATENT DOCUMENTS 1,855,550  4/1932  Hyde .................................... 403/382
2,961,270 11/1960  Reutroe ........................... 248/228 X
3,413,813 12/1968  Rock et al. ...................... 403/363 X
4,291,812  9/1981  Harmes et al. ................. 403/234 X Primary Examiner—Andrew V. Kundrat
Attorney, Agent, or Firm—Wood, Herron & Evans

[57] ABSTRACT

A coupling particularly for use with colliery roadway supports. The coupling between an upright channel section or 'I' beam and a crown beam of a similar cross-section is formed from two plates. At least a first of the plates is formed so as to lie between opposed flanges of the upright and opposed other of the two plates. The first plate extends beyond the head of the upright to a lip portion hooking all its width over the lower flange of the crown beam with preferably a bolt passing through the lip portion, the crown beam and opposed other plate. The clamping of the two plates together by the bolt or bolts securing the upright to the crown beam achieves a high resistance to lateral loading on the assembled beams to form a support.

5 Claims, 4 Drawing Figures

BEAM COUPLING

BACKGROUND OF THE INVENTION

1. Field of Use

The present invention relates to couplings between beams and supporting uprights and is particularly relevant to jointing colliery roadway supports.

Three piece supports are used in mines for supporting roofs comprising of an 'I' section crown beam supported by an 'I' section leg at each end. The leg and crown beams may be the same or differing sizes and the legs may be upright or inclined at an angle.

For the purpose of defining the couplings of the invention an 'I' beams has a central web connecting two opposed flanges, each flange having essentially five edges that is a pair of 'inner' edges meeting the central web, a pair of 'minor' edges more or less parallel to the central web and extending between the 'inner' edge to a single planar 'outer' edge at 90° to the central web.

2. Description of the Prior Art

Coupling beams and uprights has been achieved in the past by means of a steel coupling made in two halves and grooved so as to fit the flanges on both sides of the leg and crown beams at the joint. To connect the halves of the clip together a bolt has been provided which bolts the clip to one side of the leg and below the crown beam. Such an arrangement is unsatisfactory due to the tendency of the clip to open up under strain in the areas remote from the coupling bolt.

The connection of shaped beam members together is also discussed in British patent specification No. 558,909. This specification shows a light clip type connection for coupling the members of a greenhouse together but the clip construction is unsatisfactory for the high stress usage in the present application due to the lack of wrap around of the clip in the immediate area of the junction between members to be joined.

SUMMARY OF THE PRESENT INVENTION

The present invention provides improved means for coupling beams and supporting uprights, that is legs, which are particularly useful for forming colliery roadway supports.

A coupling according to the present invention comprises a pair of plates shaped so as to fit each side an upright 'I' or channel section beam and to fit around at least the lower flange of an 'I' or channel section crown beam, at least one plate comprising a first upright beam wrapping portion and a second crown beam wrapping portion, the first portion comprising a central part formed to fit between the opposed flanges of the upright beam so as to lie substantially parallel to the central web of the upright beam and having holes in the central part to receive bolts or the like passing through the upright beam's central web, the first portion further comprising wing parts extending laterally on each side of the central part so that in use the wing parts of opposed plates wrap around at least the opposed minor edges of each flange, the second portion comprising at least a lip which in use extends along its complete length around the minor edge of the lower flange of the crown beam placed across the head of the support.

The feature of providing the second portion of a said coupling plate with a lip which in use extends along its complete length around the minor edge of the lower flange of the crown beam is particularly important since it improves the strength of the joint and minimises the size and weight of the plate.

In the preferred embodiment the lip only extends over the lower flange and central web of the crown beam which allows the fitting and removing of the plate when the top surface of the crown is in contact with the roadway roof or covering.

Preferably the lip of each second portion extends further to a transverse portion which in use lies substantially parallel to the central web of the crown beam and may have holes therethrough to receive bolts or the like passed through the central web of the crown beam.

Preferably the plates are mirror images so as to wrap around 'I' beams.

The coupling according to the invention provides a particularly high resistance to loading on the support from the walls of the tunnel in which it is placed.

DRAWINGS

An embodiment of the invention will now be described with reference to the accompanying drawings in which:

FIG. 1 shows the coupling of the invention in use to join a crown and an upright beam, FIG. 2 is a cross-section of first portions of a pair of plates of this coupling of FIG. 1 bolted either side of the upright beam of FIG. 1 taken at A-A of FIG. 1, and FIG. 3 is a cross-section of the pair of plates of FIGS. 1 and 2 taken at B—B of FIG. 1 showing the plates bolted either side of the upright and crown beams, and FIG. 4 is a similar cross-section of one wrap around plate of FIGS. 1 and 2 with a further flat plate for coupling channel beams.

DESCRIPTION OF A PREFERRED EMBODIMENT

Figure 1:
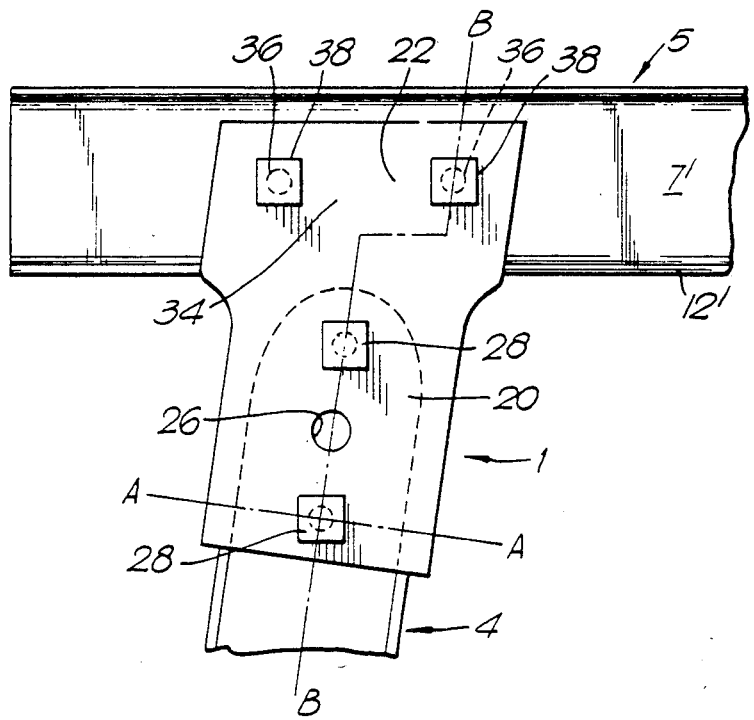
Figure 2:
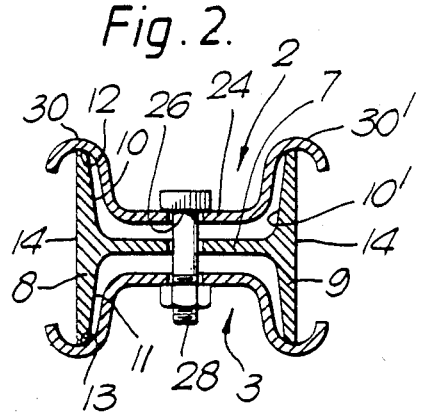
Figure 3:
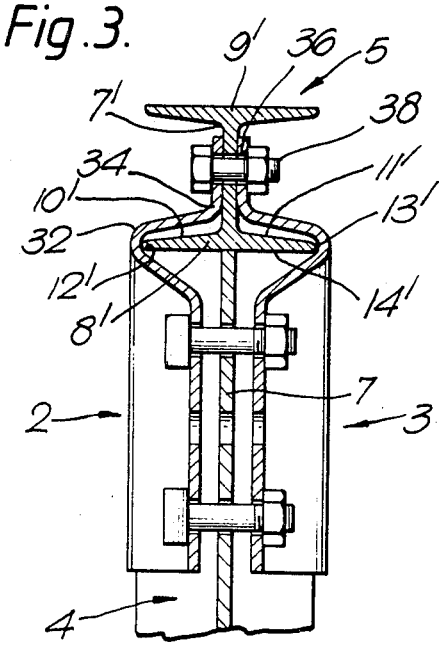

In the drawings a coupling generally shown at 1 comprises a pair of sheet steel plates 2 and 3 bolted either side of an upright beam 4 and a crown beam 5 seated on the head of the upright beam. Each beam is of 'I' section and has a central web 7 (7') interconnecting flanges 8 and 9 (8' and 9'), the flanges having inner edges 10 and 11 (10' and 11'), minor edges 12 and 13 and an outer edge 14 (14').

The beams 4 and 5 are not necessarily set at right angles to each other and in the drawings the set is such that opposed uprights are set at a slope inwards of about 10° off the vertical. The plates 2 and 3 may be formed to allow for 90° coupling or with a 10° or 15° inward set.

Each plate 2, 3 is shaped so as to fit around the crown and corresponding upright beams 5, 4 such that each plate comprises a first upright beam wrapping portion 20 and a second crown beam wrapping portion 22.

The first portion 20 comprises a central part 24 formed to fit between flanges 8 and 9 so as to lie substantially parallel to the web 7 of the upright and having holes 26 to receive bolts 28 or the like passing through the central web 7. The first portion 20 also has wing parts 30, 30' extending laterally on each side of the central part so that they wrap around minor edges 12 (13) of the flanges 8 and 9 and extend slightly over the outer edge 14 of each flange 8, 9.

The second portion 22 comprises a lip 32 extending around the minor edge 12' (13') of the lower flange 8' of the crown beam, the lip 32 extending further to a transverse portion 34 which lies substantially parallel to the central web 7' and through which are holes 36 to receive bolts 38 or the like passed through web 7'.

To couple the beams 4 and 5 together a pair of plates 2 and 3 are bolted to the uprights on either side and then bolts 38 are passed through the plates and the crown beam.

The lip portions 32 of the second portion 22 of each plate may be formed at angle 90° or 80° or even 75° to the wing parts 30, 30' so as to allow for different sets of the uprights relative to the crown as previously referred to. Leg splays of 3° or 7° are often preferred for this kind of coupling and the lip portions 32 are suitably formed for these angles.

Figure 4:
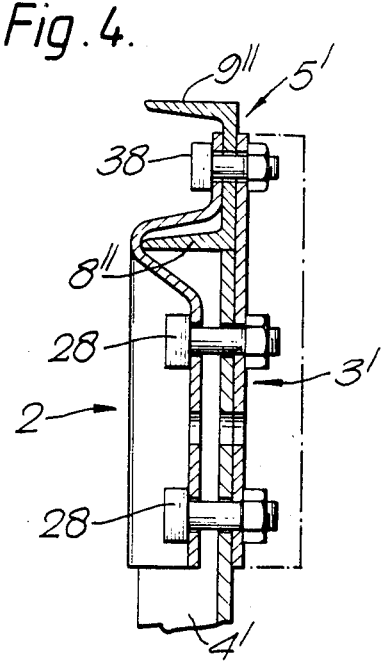

Whilst the invention is primarily intended for joining 'I' beams, channel shaped beams may be joined by using one of the wrap around plates bolted to one side and using a flat plate or even angle plate (as shown in broken lines) on the other side to bolt across the flat central webs of the channel beams as shown in FIG. 4. In this case the outer side of one flange of the crown beam seats on the head of the upright.

Tests have been conducted to compare coupling clips of the preferred embodiment with those of others available on the market and whilst generally the prior art coupling failed at 20 or 30 kN/m bending moment at the joint the present embodiments generally do not fail until a bending moment of 57 kN/m was applied with a lowest reading of 54.75 kN/m. A theoretical maximum of 68–70 kN/m is the ultimate possibility. Generally 40 kN/m has been thought to be the previous maximum possible at such a joint.

I claim:

1. A beam coupling comprising a pair of plates shaped to connect a first 'I' or channel beam with a second 'I' or channel beam, at least one plate comprising a first beam wrapping portion adapted to seat on opposed flanges on one side of said first beam, said first portion comprising a central part formed to fit between said opposed flanges of said first beam so as to lie substantially parallel to the central web of said first beam, said first portion further comprising opposed wing parts that extend laterally on each side of said central part so that in use said wing parts wrap around and are snugged against the opposed minor edges of said opposed flanges on said one side of said first beam, and said first portion having a hole in said central part to receive a fastener passing through said first beam's central web for connecting said one plate with said first beam and the other of said pair of plates, and a second beam wrapping portion adapted to seat on one flange of said second beam, said second portion comprising a lip which in use wraps around and is snugged against one minor edge of one flange of said second beam when said second beam is connected at an angle to said first beam.

2. A beam coupling as set forth in claim 1, said second portion comprising a transverse portion connected to said lip, said transverse portion being configured to lie substantially parallel to the central web of said second beam.

3. A beam coupling as set forth in claim 2, said transverse portion having a hole therethrough to receive a fastener passing through said second beam's central web.

4. A beam coupling as set forth in claim 1, each of said two plates being a mirror image of the other as installed when said first and second beams are connected, said two plates being configured to connect a first 'I' beam and a second 'I' beam.

5. A beam coupling as set forth in claim 1, one of said two plates being flat, said two plates being configured to connect a first channel beam and a second channel beam.

* * * * *